United States Patent [19]
Sanjuan et al.

[11] Patent Number: 5,489,807
[45] Date of Patent: Feb. 6, 1996

[54] DOMESTIC APPLIANCE FOR PROCESSING FOODS

[75] Inventors: Mariano P. Sanjuan; Jose M. Antolino, both of Barcelona; Alejandro H. Estaregui, Esplugues; Vicente S. Olive, Barna; Juan T. Noya, Barcelona, all of Spain

[73] Assignee: Braun Aktiengesellschaft, Frankfurt, Germany

[21] Appl. No.: 73,126

[22] Filed: Jun. 7, 1993

[30] Foreign Application Priority Data

Jun. 20, 1992 [DE] Germany .................. 42 20 233.7

[51] Int. Cl.[6] .................................................. H01M 10/46
[52] U.S. Cl. ................... 307/66; 307/48; 307/80; 318/257; 320/2
[58] Field of Search ........................ 307/64–66, 48, 307/80, 85; 320/2; 318/257

[56] References Cited

U.S. PATENT DOCUMENTS

| | | | |
|---|---|---|---|
| 3,525,912 | 8/1970 | Wallin | 318/17 |
| 3,710,224 | 1/1973 | Daniels | 320/2 |
| 4,413,211 | 11/1983 | Fowler | 318/257 |
| 4,620,110 | 10/1986 | Cooney | 307/48 |
| 4,672,292 | 6/1987 | Hernandez | 320/2 |
| 5,159,256 | 10/1992 | Mattinger et al. | 320/2 |

FOREIGN PATENT DOCUMENTS

| | | |
|---|---|---|
| 0341395 | 3/1989 | European Pat. Off. . |
| 93106428 | 11/1993 | European Pat. Off. . |
| 1554399 | 1/1969 | France . |
| 1126082 | 3/1962 | Germany . |
| 1221919 | 7/1966 | Germany . |
| 1248875 | 8/1967 | Germany . |

*Primary Examiner*—William M. Shoop, Jr.
*Assistant Examiner*—Peter Ganjoo
*Attorney, Agent, or Firm*—Fish & Richardson

[57] ABSTRACT

The invention is directed to a domestic appliance for processing foods, with a basic device (1) accommodating an electric switch (6) and an electric motor (5), as well as electrical connecting means (4) for connection to an electrical power supply. The basic device (1) includes an electric accumulator (7) for operation independently of the line. To accomplish ease of manipulation and a higher as well as consistent power when the domestic appliance is operated on the line, it is suggested that the basic device (1) be provided with an electric switching arrangement (8, 14) which, in a first switching position, provides for connection of the electric motor (5) to the accumulator (7) and which, in a second switching position, provides for connection of the electric motor (5) and the accumulator (7) to the power pack (3), that an electric line cord (4) connect the power pack (3) to an adapter body (2) adapted to be mechanically connected with the basic device (1), and that the mechanical connection between the basic device (1) and the adapter body (2) also cause the electric switching arrangement to be brought into its second switching position.

11 Claims, 4 Drawing Sheets

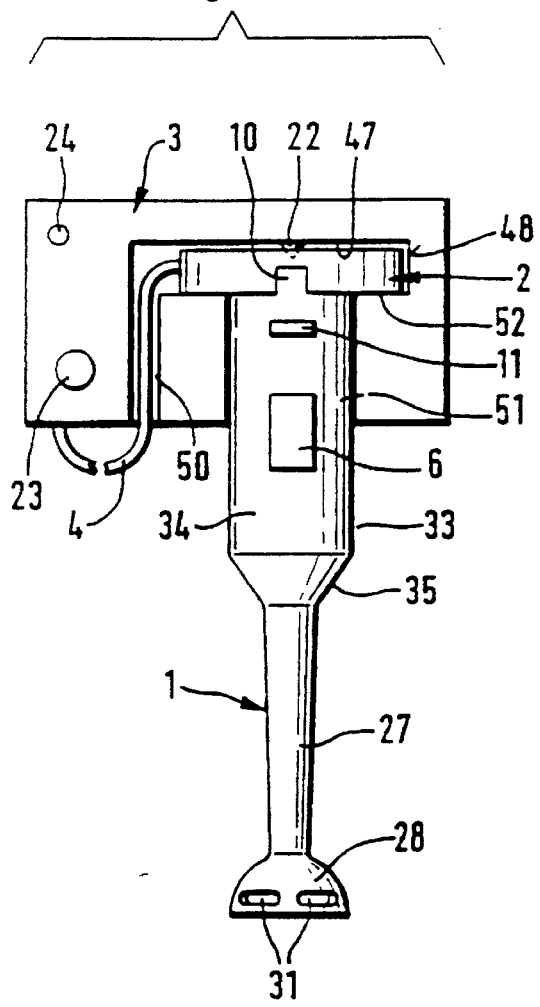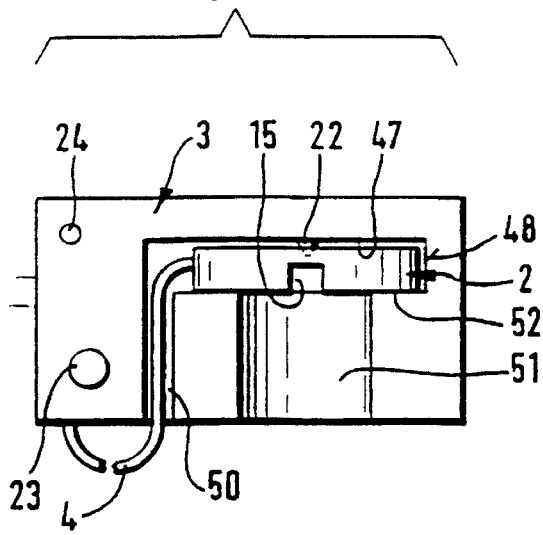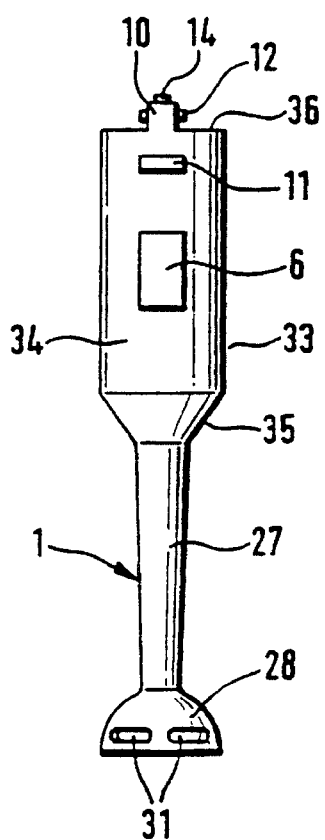
Fig. 1
Fig. 2

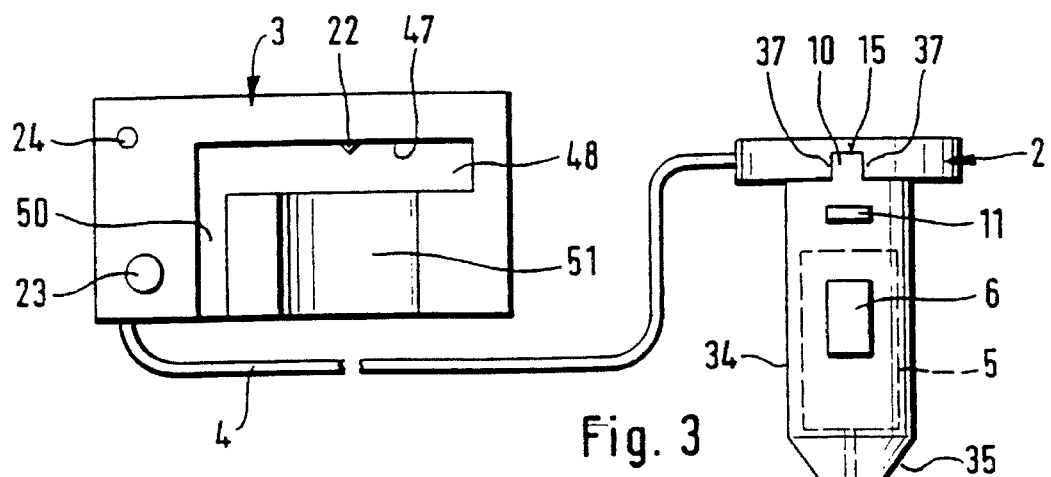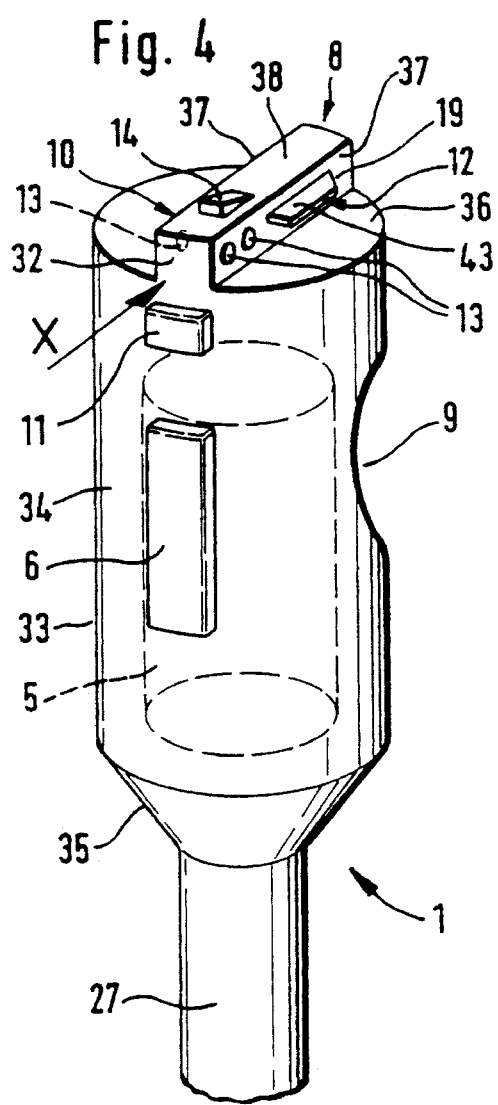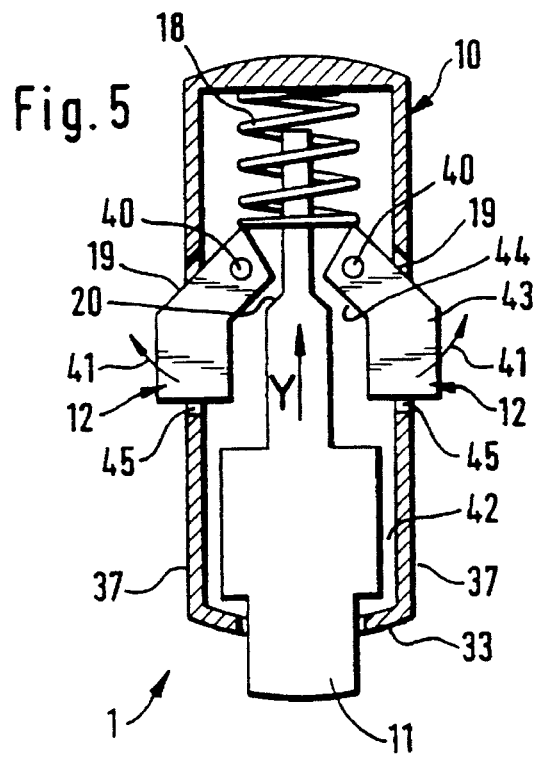

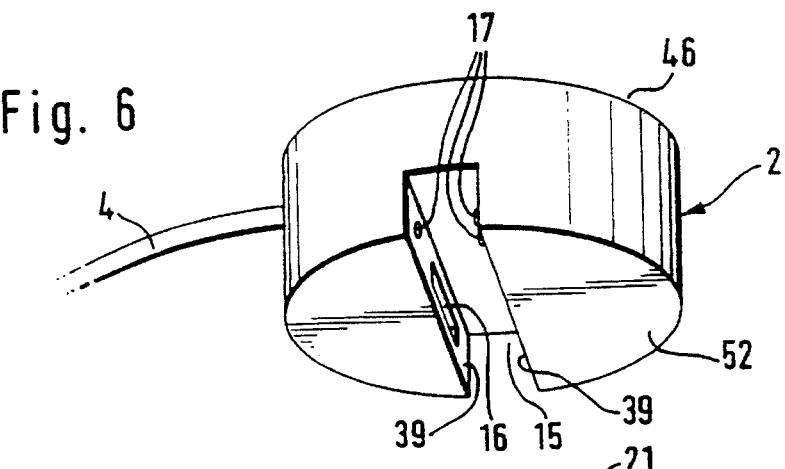
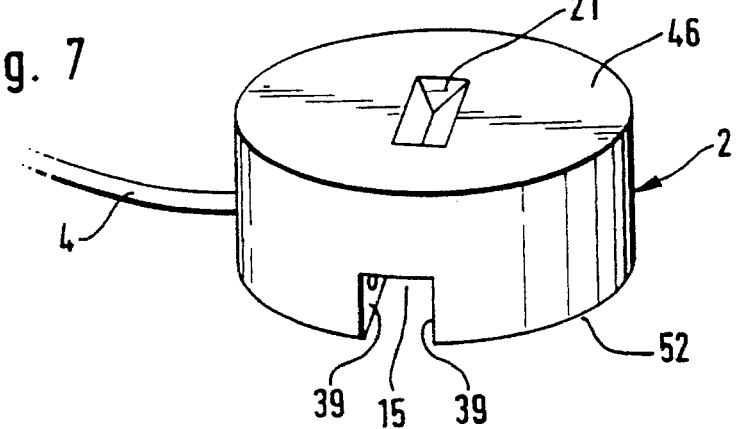
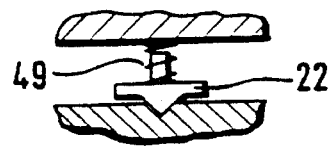
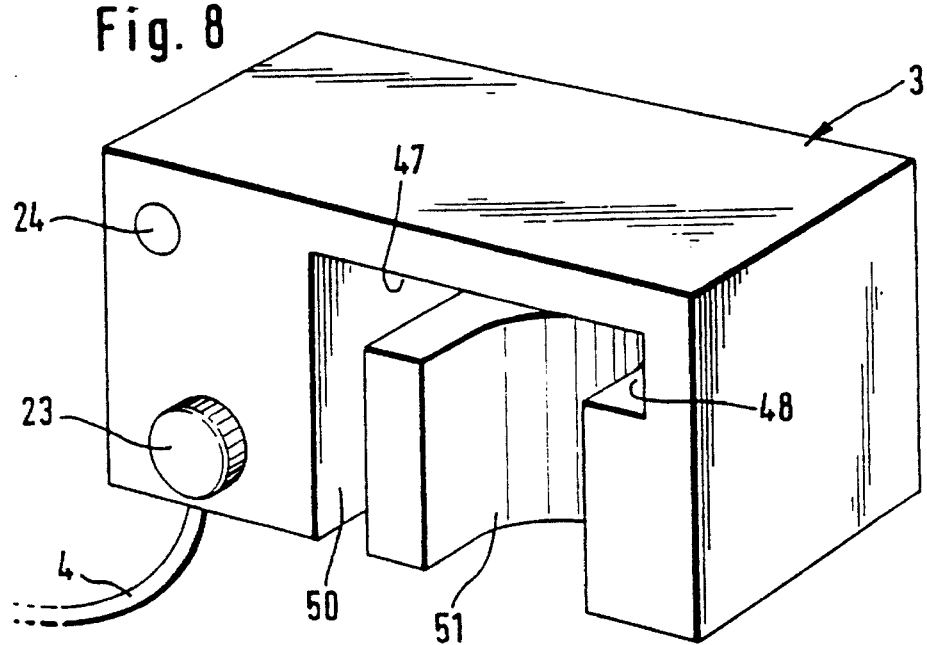

DOMESTIC APPLIANCE FOR PROCESSING FOODS

This invention relates to a domestic appliance for processing foods, with a basic device accommodating an electric switch and an electric motor, as well as electrical connecting means for connection to an electrical power supply, with the basic device including an electric accumulator for operation independently of the line, in addition to being adapted to be connected to a power pack.

A domestic appliance of this type is already known from DE-B-11 26 082. In this appliance, the electric motor is adapted to be connected by means of a switch to an accumulator housed in the basic device of the domestic appliance, or, by means of a plug-and-socket connection provided on the housing, to the accumulator of a motor vehicle, for example, or, by means of a transformer provided in the power cord, to the public electricity supply. Accordingly, when it is desired to operate the domestic appliance from the electricity supply rather than from the accumulators, current will flow through the plug-and-socket connection and the accumulators to the electric motor with the switch turned on. However, this involves the disadvantage that the domestic appliance cannot be operated on the line in cases where, for example, the accumulators have been removed or are defective.

Further, from DE-B-12 48 875 a domestic appliance powered by an electric motor independently of the line is known in which a wall mount equipped with a charging stand is provided into which the domestic appliance has to be fitted for recharging the accumulators received in the appliance. In this arrangement, the domestic appliance can only be operated from the accumulators, eliminating the possibility of using the domestic appliance when the accumulators are run down or defective.

For example, when it is intended to construct a domestic appliance with the aim to provide it with a higher electrical power, the appliance will become heavier and less convenient to handle because of the resulting larger dimensions of the accumulators. By contrast, when the size of the accumulators remains unchanged, their operating time between two recharges will be reduced.

It is therefore an object of the present invention to devise a prior-art domestic appliance which, when operated on the line, works fully independently of the accumulators and, in the process, is capable of delivering a consistently high power.

According to the present invention, this object is accomplished in that the basic device includes an electric switching arrangement which, in a first switching position, provides for connection of the electric motor to the accumulator and which, in a second switching position, provides for connection of the electric motor and the accumulator to the power pack, that an electric line cord connects the power pack to an adapter body adapted to be mechanically connected with the basic device, and that the mechanical connection between the basic device and the adapter body also causes the electric switching arrangement to be brought into its second switching position. By virtue of this solution, a domestic appliance is provided which permits tasks having low electrical power requirements as, for example, whisking and whipping, to be performed independently of the line without the inconvenience of a power cord, and in which a connection to the available electric service energy is only necessary for tasks having high power requirements as, for example, the kneading of dough. In the domestic appliance of the present invention which is easy to maneuver in practical use, a structure functionally clear to an operator is accomplished. Thus, in cases where, for example, the capacity of the accumulators is exhausted during operation of the domestic appliance, an operator may continue working with the domestic appliance using external service energy simply by fitting the adapter onto the domestic appliance, without the need for long recharging intervals. In addition, the adapter body ensures an automatic electrical operating mode protected against faulty operation by means of which the electric switching arrangement is actuatable.

In practical use, the processing tasks having low power requirements need no speed control of the drive, so that it is sufficient to equip the power pack with a speed control device, as provided in a preferred embodiment of the present invention. By arranging the possible speed control device in the power pack, the basic device remains straightforward in construction, small, and easy to manipulate.

A particularly safe securing is accomplished by providing for the adapter body and the basic device to be adapted to be in positive engagement with each other, it being particularly suitable for practical manipulation when the means providing positive engagement between these two parts is a biased locking device releasable by means of a release device.

A storage possibility for the complete appliance which is essential for its use in practice is afforded in that the housing of the power pack possesses a receptacle for the adapter body and the basic device, it being advantageous with respect to the securing against accidental disengagement of this connection if a lock-down connection is provided between the adapter body and the housing of the power pack.

A one-hand control possibility essential for practical use is obtained in that the resisting force of the lock-down connection acts in the direction in which the basic device is removable from the adapter body.

Unrestricted capabilities in respect of the selection of the appliance site are ensured by an embodiment of the present invention in which the housing of the power pack is configured as a wall mount.

Further advantageous features as well as the function of the present invention will become apparent from the subsequent description of an embodiment of the present invention as exemplified in an immersion blender. In the accompanying drawings, FIGS. 1 to 3 are greatly simplified views of different modes of operation of the device;

FIG. 4 is a perspective view of the basic device, absent the end of the shank where the tool for processing the food is provided, with the switching arrangement being shown with the adapter body disengaged therefrom;

FIG. 5 is a view of the locking mechanism integrated into the switching arrangement, as seen looking down on the basic device of FIG. 4;

FIGS. 6 and 7 are two views of the adapter body;

FIG. 8 is a view of the housing of the power pack;

FIG. 9 is a detail view of the lock-down button provided in FIG. 8 on the underside of the receptacle.

Figure 10:
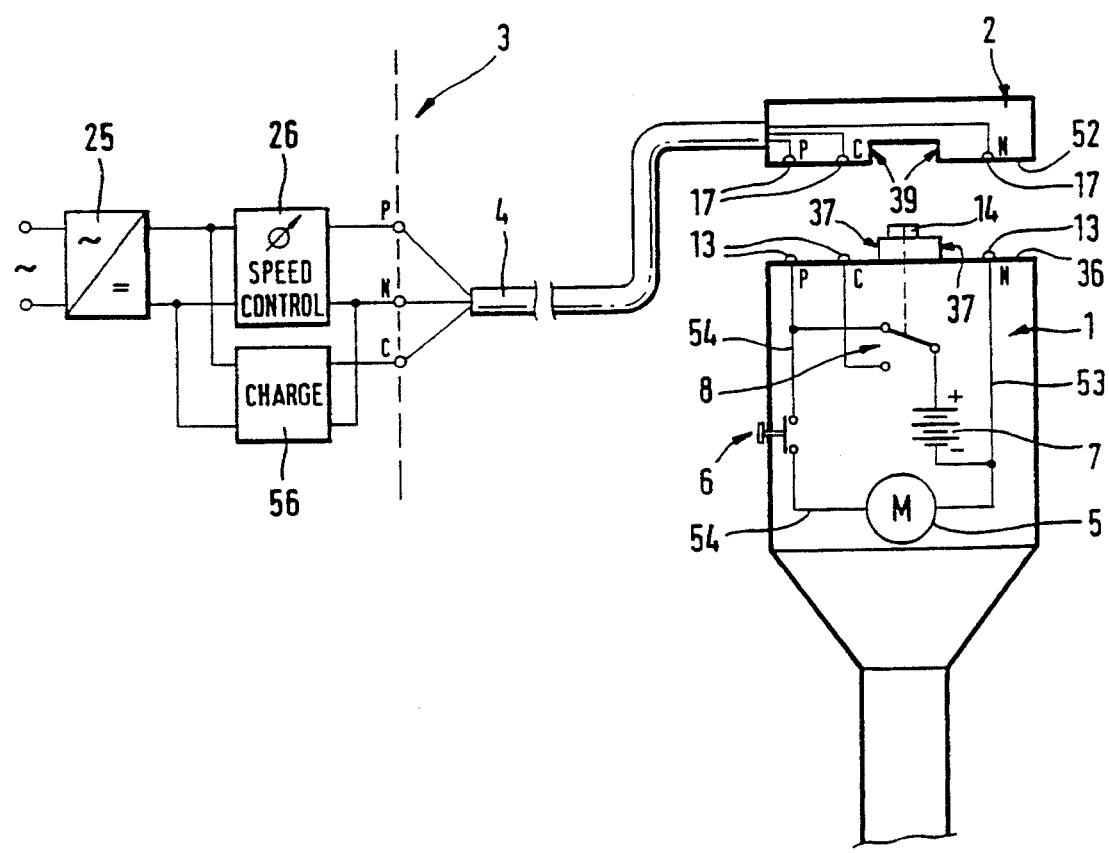
FIG. 10 is a schematic of the electrical circuitry.

FIG. 1 shows a basic device 1 preferably configured as an immersion blender in its parking position. The entire household appliance is composed of the basic device 1, an adapter body 2 adapted to be coupled therewith, and a power pack 3 configured as a wall mount, with the power pack 3 being electrically connected to the adapter body 2, and through the adapter body to the basic device, by means of a cord 4.

FIG. 2 shows the line-independent mode of operation of the immersion blender 1. To this end, the basic device 1 is disengaged from the adapter body 2 in the manner to be subsequently described, with the adapter body remaining within the wall mount 3.

FIG. 3 shows the immersion blender 1 in the line mode of operation in which the basic device 1 is maintained in engagement with the adapter body 2. Both devices 1, 2 are withdrawn from the wall mount as one, the basic device 1 receiving its energy from the electricity supply (not shown) through the cord 4.

FIG. 4 shows the basic device 1 which—as becomes also apparent from FIG. 10—comprises an electric motor 5, an On/Off switch 6, an accumulator 7 (only in FIG. 10), and a switching arrangement 8. In a manner known per se, the housing of the basic device 1 of FIG. 3 is configured as an essentially cylindrical body 34 provided with steps 9, 35, 36 and continuing in downward direction in a cylindrical shank 27 having at its end a bell structure 28 open in downward direction. The bell structure 28 receives a processing tool (cutter) 30 which is in driving relationship to the electric motor 5 through a drive shaft 29 centrally located inside the shank 27. The bell structure 28 is provided with slots 31 extending approximately horizontally on the periphery to allow better circulation of the foods during blending or chopping.

In FIG. 4, a recessed grip 9 lies diametrically opposite the On/Off switch 6. Provided on the step 36 of the basic device 1 is a ridge 10 which, arranged at center, extends diametrically over the full diameter and has its end 32 aligned flush with the circumferential surface 33 of the cylindrical body 34. Both the On/Off switch 6 and the release button 11 are in relative alignment, protruding equally from the circumferential surface 33. A respective latch member 12 projects from the side walls 37 of the ridge 10. In addition, respective electrical contacts 13 of the three poles P, C and N (see FIG. 10) are indicated on the side walls 37. An actuating button 14 protrudes from the upper side 38 of the ridge 10 in ramp shape. It serves to actuate the switching arrangement 8.

The actuating button 14 of FIG. 4 will be pushed down automatically when the ridge 10 is inserted into the corresponding groove 15 of the adapter body 2 shown in FIG. 6. In FIG. 6, the lateral boundary walls 39 of the groove 15 are each provided with respective recesses 16 for potential engagement with the latch members 12 of the basic device 1. In addition, contacts 17 are provided on these walls 39 to establish electrical connection with each other following latching engagement of the basic device 1 with the adapter body 2.

As shown in FIG. 5, the latch members 12 are biased by a spring 18 bearing thereon about their respective bearing pins 40 such that their latching portions 43 move out of the ridge 10 in the direction of arrows 41. The bearing pins 40 are arranged normal to the direction of insertion X (FIG. 4) of the basic device 1, that is, according to FIG. 5 they lie ahead of the latching portions 43 when looking down into the interior of the adapter body 2, enabling the latch members to be readily displaced into the interior of the ridge 10 in opposition to the force of the spring 18 through their sloping portions 19.

Displacement of the release button 11 in the direction Y enables the latch members 12 to pivot inwardly into the inner chamber 42, causing them to become disengaged from the recesses 16 (FIG. 6). As pressure is exerted inwardly in the direction Y, the conical portion 20 of the release button 11 bears against the sloping surfaces 44 of the latch members 12. Following its actuation, the spring 18 and the latch members 12 return the release button 11 to its outer position. As this occurs, the latching portions 43 will automatically move out of the side walls 37 of the openings 45.

As becomes apparent from FIG. 7, the circular-disk shaped adapter body 2 has on its side 46 facing away from the groove 15 a central V-shaped indentation 21. As indicated in FIG. 9, the indentation 21 serves for engagement of a locking button 22 located in the housing of the power pack 3 on the underside 47 of the receptacle 48. The receptacle 48 serves to receive the adapter body 2 as is clearly shown in FIGS. 1 and 2. The cord 4 is routed in a duct 50. Adjoining the receptacle 48 when viewing the FIGS. 1, 2, 3 and 8 is a cylindrical receptacle 51 serving to receive the body 34.

According to FIG. 9, the locking button 22 is biased in the direction of the adapter body 2, that is, in downward direction when viewing the drawing, by a compression spring 49. FIG. 8 further shows a rotary knob 23 for speed control as well as a pilot lamp 24 which, for example, may serve as a charging indicator light for the accumulator 7.

As may be explained in more detail with reference to FIG. 10, the power pack 3 includes, in addition to the actual power supply unit 25 converting the A.C. line voltage to a substantially lower D.C. voltage, a speed control device 26 as well as a circuitry 56 enabling the power pack 3 to be operated also as a recharger. The circuitry 56 incorporates a current limiter and a diode protecting against accumulator discharge. When the immersion blender 1 operates in the accumulator mode, the two last-mentioned elements are short-circuited by a magnetically actuatable microswitch not shown. With the microswitch open, that is, with the immersion blender 1 operated on the line, the accumulator may also be recharged while the device 1 is in operation.

The electrical configuration of the basic device 1 shall be explained in greater detail in the following with reference to FIG. 10.

For connection to the three-wire line cord 4, contact 13 is provided with three poles comprising single contacts P, C and N—for clarity of illustration, contacts 13 are shown in FIG. 10 as being provided on respective end surfaces 36, 52 rather than on the side walls 37, 39, that is, in a horizontal plane which may also be contemplated. Contact N is directly connected to the electric motor 5 through conductor 53, and contact P through conductor 54 and the On/Off switch 6 inserted therein. N stands for negative, P for positive, and C for charge. Accumulator 7 has its negative terminal connected to conductor 53 connecting contact N to the electric motor 5. With the actuating button 14 not actuated, accumulator 7 has its positive terminal connected to conductor 54 between contact P and the On/Off switch 6.

When the actuating button 14 is pushed down which occurs by coupling the basic device 1 with the adapter body 2 (FIGS. 1, 3), the switching arrangement 8 operates to connect the positive terminal of the accumulator 7 to contact C, enabling the accumulator 7 to be recharged.

When the basic device 1 is removed from its parking position shown in FIG. 1 by operation of the release button 11, the adapter body 2 will remain within the housing of the power pack 3 as shown in FIG. 2, which is due to the effect of the locking button 22 in the housing of the power pack 3. Being biased by a spring not shown, the actuating button 14 will be pushed upwardly, causing the switching arrangement 8 to assume the position shown in FIG. 10 in which the accumulator 7 is connected to the On/Off switch 6. This thus results in a line-independent mode of operation of the immersion blender 1 in which, however, a speed control through the power pack 3 is not possible unless, of course, the immersion blender is equipped with a built-in control of its own.

When the adapter body 2 is latched with the basic device 1 or when the basic device 1 is removed from its parking position together with the adapter body 2 without the release button 11 being operated, the actuating button 14 and the switching arrangement 8 cause the accumulator 7 to remain disconnected from the On/Off switch 6, the switching arrangement 8 then establishing a connection between the accumulator 7 and the charging conductor C. Because in this condition the contacts 13 and 17 co-act with one another, the accumulator can be recharged; moreover, the basic device 1 can be operated on the line, enabling the operating speed to be varied as desired using the rotary knob 23 which operates on the speed control device 26.

The electrical switch-over within the basic device 1 is performed automatically by its engagement with, or disengagement from, the adapter body 2. This eliminates the possibility of faulty operation, the more so since the actuating button 14 is not accessible from the outside when the device is in the line mode. With the immersion blender in the accumulator mode, accidental operation of the actuating button 14 merely turns off the appliance.

We claim:

1. A domestic appliance for processing foods comprising housing structure, an electric motor and an electric accumulator in said housing structure, line terminal structure on said housing structure, charging terminal structure on said housing structure, a control switch on said housing structure, power pack structure having terminal structure for connection to an electric line cord, and an adapter body adapted to be mechanically connected to said housing structure, said adapter body including first and second terminal structures, said first terminal structure being electrically connected to said line terminal structure and said second terminal structure being electrically connected to said charging terminal structure when said power pack structure is mechanically connected to said housing structure, electrical circuitry including:

a first circuit connecting said electric motor and said control switch with said line terminal structure, an electric switch, said electric switch having a first position connecting said electric accumulator in series circuit with said electric motor and said control switch for energizing said motor independent of said line terminal structure, and a second position connecting said electric accumulator in a second circuit with said charging terminal structure for charging said accumulator separate from and independent of said control switch, said motor being connectable to said line terminal structure through said control switch in said first circuit for energizing said motor when said electric switch is in said second position, and interconnection structure in said adapter body and cooperating with said housing structure for causing said electric switch to be switched from said first position to said second position when said power pack adapter body is mechanically connected to said housing structure.

2. The appliance of claim 1 wherein said adapter body includes receptacle structure for receiving said housing structure.

3. The appliance of claim 2 and further including lock-down connection structure between said adapter body and said power pack structure.

4. The appliance of claim 3 wherein said lock-down connection structure acts in the direction of removal of said adapter body from said power pack structure.

5. The appliance of claim 4 wherein said power pack structure is adapted for wall mounting.

6. The appliance of claim 5 wherein said adapter body includes receptacle structure for receiving said housing structure, and further including positive engagement structure for coupling said adapter body and said housing structure together, said positive engagement structure including a biased locking device and release latch structure for releasing said biased locking device.

7. The appliance of claim 6 wherein said power pack structure includes a speed control device adapted to be connected to said line terminal structure by said adaptor body.

8. The appliance of claim 7 and further including lock-down connection structure between said adapter body and said power pack structure.

9. The appliance of claim 1 wherein said power pack structure includes a speed control device adapted to be connected to said line terminal structure by said adapter body, and recharger circuitry connected to said second terminal structure, said recharger circuitry including a current limiter and being adapted to be conducted to said charging terminal structure by said adapter body.

10. The appliance of claim 1 wherein surfaces of said adapter body and said housing structure are physically in contact with one another when said adapter body is mechanically connected with said housing structure.

11. The appliance of claim 1 and further including positive engagement structure for coupling said adapter body and said housing structure together, said positive engagement structure including a biased locking device and release latch structure for releasing said biased locking device.

* * * * *